Jan. 5, 1965 F. I. LAVIGUEUR 3,164,362
TRUNNION MOUNTED BALL VALVES HAVING SPRING BIASED SEATS
Filed Oct. 7, 1960 2 Sheets-Sheet 1

FRANCOIS I. LAVIGUEUR
INVENTOR.

BY DUANE C. BURTON
Attorney

FRANCOIS I. LAVIGUEUR
INVENTOR.

BY DUANE C. BURTON
Attorney

United States Patent Office 3,164,362
Patented Jan. 5, 1965

3,164,362
TRUNNION MOUNTED BALL VALVES HAVING SPRING BIASED SEATS
Francois I. Lavigueur, New London County, Conn., assignor to General Dynamics Corporation, New York, N.Y., a corporation of Delaware
Filed Oct. 7, 1960, Ser. No. 61,279
1 Claim. (Cl. 251—174)

This invention relates generally to ball valves and more particularly to trunnion mounted ball valves.

Ball valves are generally classified as "free floating" and trunnion mounted. The trunnion mounted differs from the free floating in that substantially all the thrust exerted by the fluid pressure on the closed ball is transmitted directly to the housing through the trunnions rather than through the seat seal and that the sealing occurs on the upstream side rather than on the downstream side. The free floating ball valve has a pressure limitation directly related to the strength properties of the seat seal material used. The trunnion mounted ball valve does not have such a pressure limitation. Although trunnion mounted ball valves outperform free floating ball valves by handling without leakage for substantially longer periods of time up to at least three times more pressure and by maintaining a positive seal at low pressure following a high pressure application, the trunnion mounted ball valve has not been able to compete price-wise with the free floating ball valve. A large part of this price differential stems from the complex seat seal heretofore used in trunnion mounted ball valves wherein a relatively large number of parts are required. The main object of this invention is to provide a trunnion mounted ball valve having a greatly simplified, inexpensive seat seal.

Another object of this invention is to provide a top loaded, easy to assemble and to disassemble trunnion mounted ball valve which can be repaired and maintained without removing same from a piping system.

A further object of this invention is to provide a trunnion mounted ball valve having a novel, spring-biased, pressure-actuated seat seal mounted for axial movement in one of the fluid passages of the valve housing comprising two annular cooperating seal members.

A still further object of this invention is to provide a trunnion mounted ball valve having a novel, inexpensive, spring-biased, pressure-actuated seat seal mounted for axial movement in one of the fluid passages of the valve housing comprising a retaining ring and two annular seal members, one of said seal members having a portion thereof closely confined by said retaining ring and having an outer surface comprising two annular axially extending surfaces connected by an annular radially extending surface, the outer surface having the smaller diameter having formed therein an annular groove in which is positioned the other said annular seal member.

The foregoing and other objects and advantages will become more apparent from the specification and drawings. In the drawings, wherein like reference characters indicate corresponding parts throughout the several views.

Figure 1:
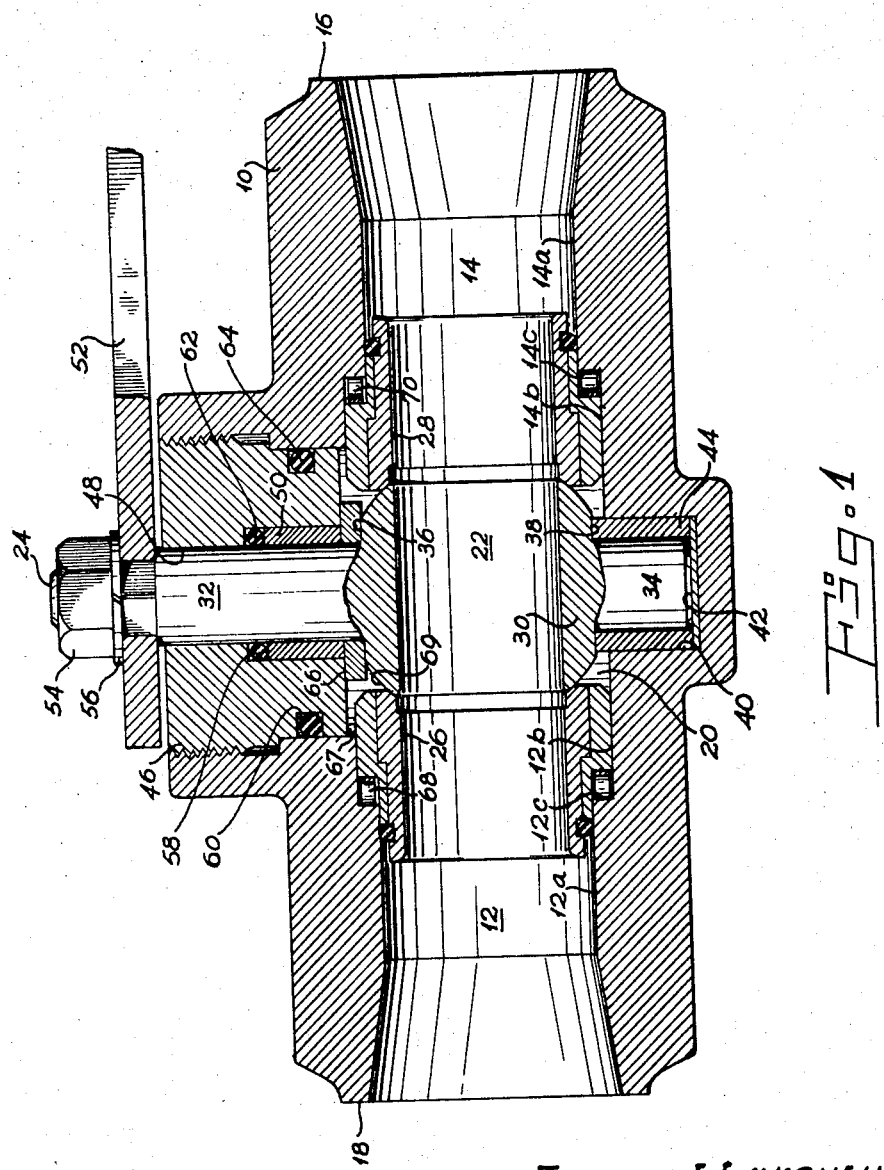
FIGURE 1 is a longitudinal sectional view of one embodiment of the valve structure according to the present invention.

Referring now to the drawings, particularly FIGURE 1, the valve structure comprises a generally cylindrically single-piece housing 10 made of suitable material, such as stainless steel, which has two cylindrically or generally cylindrical fluid passages 12 and 14. The outer ends 16 and 18 of said fluid passages are machined to permit welding of the valve in a pipe line (not shown). Said ends may, however, be internally or externally threaded, flanged or have any other suitable end connection as desired.

The fluid passages 12 and 14 communicate with a central space 20 in the housing 10. The walls defining said fluid passages 12 and 14, include two annular axially extending surfaces 12a, 12b and 14a, 14b connected respectively by annular radially extending surfaces 12c and 14c. The fluid passages 12 and 14 communicate with a passage 22 in an elongated rotary valve member 24 which is mounted in central space 20 between two seat seals 26 and 28. The elongated rotary valve member 24 has a ball portion 30, trunnions or stem portions 32 and 34 and annular shoulders 36 and 38 machined at the junction of said trunnions or stem portions 32 and 34, respectively, with the ball portion 30.

The central space 20 extends through one side of the housing 10 and has a longitudinal axis disposed transversely to the longitudinal axis of said fluid passages 12 and 14. The walls defining said central space 20 include an annular axially extending surface 40 and a flat circular surface 42 disposed across one end of the central space's said annular axially extending surface 40. The surfaces 40 and 42 define a cylindrical-shaped recess in which is positioned stem 34 and annular bushing 44.

A removable bonnet 46 having a vertical bore 48 is threaded into the wall of the valve housing 10. Positioned within said vertical bore 48 are an annular bushing 50 and stem 32, said stem 32 projecting through said bonnet 46 and having a handle 52 attached thereto by a removable nut 54 and lock washer 56. Formed within said removable bonnet 46 are annular grooves 58 and 60 in which are respectively positioned O ring seals 62 and 64. O rings 62 and 64 prevent leakage between the stem 32 and the bonnet 46 and between the housing 10 and the bonnet 46, respectively.

Stops (not shown) included as an integral part of the housing 10 cause interference with a portion (not shown) of the handle 52 as said handle is rotated to position the rotary valve member 24. Said stops are positioned such that interference with the handle occurs when the fluid passage 22 within the ball portion 30 is aligned with the fluid passages 12 and 14 (open position) and when said fluid passage 22 within said ball portion 30 extends across said fluid passages 12 and 14 (closed position).

An annular bearing 66 is positioned on the ball's annular shoulder 36 between the ball portion 30 and the lower surface 67 of the bonnet 46. With this particular valve structure, it is not necessary to seal between stem 34 and housing 10; however, if the stem 34 were to extend through the wall of the housing 10, a seal similar to seal 62 would be required to prevent leakage between the stem 34 and housing 10. Where stem 34 does not extend through the wall of the housing 10, the fluid pressure produces a resultant upward thrust on the rotary valve number 24. This resultant thrust urges the rotary valve member 24 against the lower surface 67 of the bonnet 46 and contributes to the operating torque of the valve. High fluid pressure produces not only undesirable high operating torque but also galling; however, the use of an annular bearing 66 between the rotary valve member 24 and the lower surface 67 of bonnet 46 greatly reduces the amount of operating torque and eliminates galling.

Figure 4:
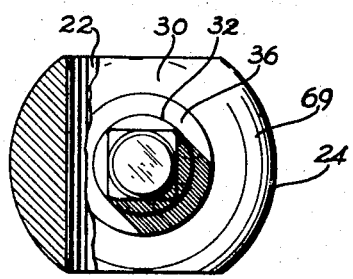
FIGURE 4 is a plan view partially in cross-section of the elongated rotary valve element shown in FIGURE 1.

The rotary valve member 24 is shown in FIGURE 4 having a fluid passage 22 therethrough, the length of which is less than the diameter of the ball portion 30, a feature which is important in assembling or disassembling the valve. The ball portion 30 has an outer convexly curved surface 69 which engages one axial end of each of the seat seals 26 and 28 when the valve member is in the open and closed positions.

The required concentricity or roundless of the ball's outer convexly-curved surface is, if positive sealing contact is to be maintained, dependent on the ability of the seat seal's material engaged in sealing contact with said surface to deform and fill the irregularities of said surface resulting from out of roundness. Consequently, the degree of concentricity becomes quite important in high-pressure applications where relatively stiff, non-compressible materials are used. For example, it has been found that the degree of concentricity of the ball's outer convexly curved surface for a valve handling pressures in the range of 5,000 p.s.i., and using seat seals having the portion thereof in sealing contact with the ball surface made from a nylon impregnated with molybdenum disulphide, sold under the designation "Nylatron GS" by Polymer Corporation of America, of Reading, Pennsylvania, must be held within approximately 1/1000 of an inch or 0.05% of the diameter of the ball.

Wave springs 68 and 70 are used to urge, respectively, the seat seals 26 and 28 against the outer convexly curved surface 69 of the ball portion 30. Said wave springs are positioned between the annular radially extending surface (12c, 14c) of each fluid passage and a like surface on the outer surface of each seat seal.

An important aspect of the invention concerns the construction of the seat seals which are simple in design, inexpensive to manufacure and have a long operating life. The seat seal shown in FIGURE 2 comprises two co-operating seal members, annular member 72 and O ring 74. Annular member 72 may be made from various polymers including Teflon, the Du Pont trade name for a tetrafluoroethylene resin, and Nylatron GS. Although this particular configuration is primarily intended for use in valves handling low pressures, a 2½" valve using this design wherein annular member 72 was made from Nylatron GS has successfully handled pressures in excess of 2,000 p.s.i.

Annular member 72 has an outer surface including two annular axially extending surfaces 72a and 72b connected by an annular radially extending surface 72c. The outer annular axially extending surface 72a has formed therein an annular groove 76 in which is positioned O ring 74. Where valves utilize seat seals of the configuration shown in FIGURE 2, the annular groove 76 need not be formed within surface 72a but may be formed within the fluid passage surface (12a or 14a).

Annular member 72 has an inner surface including an annular axially extending surface 73a and a truncated conical surface 73b. The annular area of contact between annular member 72 and ball portion 30 is preferably kept small to insure a relatively high contact pressure therebetween and to reduce the operating torque which results from the microscopic flow of the material from which annular member 72 is made into the irregularities on the ball's surface. One way to reduce the annular area of contact between annular member 72 and ball portion 30 is by forming surface 73b to effect a line contact between ball portion 30 and surface 73b. However, since a line contact results in rapid wearing of surface 73b, it is preferable that something more than line contact be used. A large area of contact can be easily reduced by increasing the diameter of annular surface 73c, see FIGURE 3, or preferably by cutting from the end of annular member 72 in contact with ball portion 30, a portion of said annular member 72.

Figure 2:
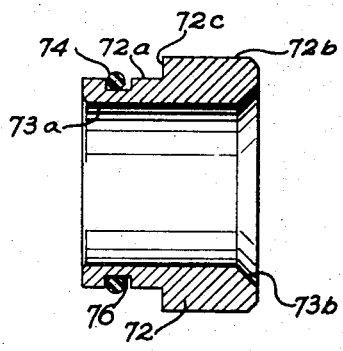
FIGURE 2 is a longitudinal sectional view of one embodiment of the valve seat seal structure according to the present invention.
Figure 3:
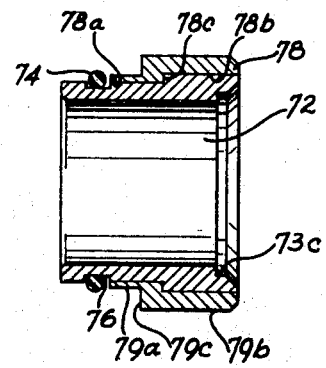
FIGURE 3 is a longitudinal sectional view of another embodiment of the valve seat seal structure according to the present invention.

The seat seal shown in FIGURE 3, which is the same as that shown in FIGURE 1, is used primarily in valves handling high pressures and differs from that shown in FIGURE 2 in that it has an annular retaining ring 78 closely confining a portion of annular member 72. Said retaining ring has inner and outer surfaces each including two annular axially extending surfaces 78a, 78b, and 79a, 79b, connected respectively by annular radially extending surfaces 78c, 79c. The inner surface of annular member 72 preferably has a truncated conical surface as shown. The axial length of the retaining ring's annular axially extending inner surface 78a equals the axial length of the mating surface of annular member 72 between the annular groove 76 formed and the annular radially extending surface 72c. Since this particular configuration is used primarily in valves handling high pressure, the annular groove 76 should be formed in surface 72a of annular member 72 rather than in surfaces 12a, 14a of fluid passages 12, 14.

In order for the seat seal to be pressure actuated, the axial end of the seat seal positioned in sealing contact with ball portion of said valve member must have a smaller projected annular area exposed to fluid pressure than the other end of the seat seal. Since large differences in projected annular areas not only increase the total thrust transmitted to the housing through the ball stems, thereby increasing the operating torque, but also increase for the same pressure the stress imposed on annular member 72, the difference in projected annular areas of said seat seal is preferably kept small.

The valve is assembled as follows. One wave spring 68 (or 70) is slipped over the annular member's axial end having the smaller outer diameter. An O ring 74 is positioned within the annular groove 76 formed in annular member 72. One seat seal and wave spring unit is placed in each of the fluid passages 12, 14. The axial end of the seat seal having the smaller outer diameter is inserted in the fluid passages 12, 14. Annular bushing 44 is positioned within the cylindrical-shaped recess formed in central space 20. Next, annular bearing 66 is slipped over stem 32 and seated on annular shoulder 36. Annular bushing 50 is then slipped over stem 32. The elongated rotary valve member 24 upon which are mounted said annular bearing 66 and annular bushing 50 is inserted with the ball in the open position within central space 20 until stem 34 is positioned in bushing 44. O rings 62 and 64 are respectively positioned in annular grooves 58 and 60 formed in the bonnet 46. The bonnet 46 is then slipped over stem 32 and threaded into the housing 10. The handle 52 is slipped over the portion of stem 32 projecting above bonnet 46 and is secured in place with a lock washer 56 and nut 54. The valve is now completely assembly and ready for installation in a pipe line. Disassembly thereof may be accomplished whether or not the valve is installed in a pipe line without the necessity of first removing same from said pipe line, by reversing the steps outlined above.

It will be readily appreciated that a valve having a seat seal simple in design and inexpensive to make has been described. As a result of the combination of the wave spring with the pressure actuation feature seat seals of this design will have an exceptionally long operating life.

It is to be understood that this invention is not limited to the exact embodiment of the device shown, which is merely by way of illustration and not limitation, as various other forms and modifications will be apparent to those skilled in the art. For example, only one seat seal installed on the upstream side of the rotary valve element is required where fluid pressure is from one direction only.

I claim:

A valve, comprising a housing having a central space and a pair of generally cylindrical longitudinally aligned end passages each communicating with said central space and with the exterior of said housing, said housing having a generally cylindrical opening through one side thereof and communicating with said central space and an annular internal recess in the side thereof directly opposite said opening, the axis of said opening being transverse to the axis of said end passages, the walls of one of said end passages forming a valve seat including a first annular axially extending surface, a second annular axially extending surface located axially inwardly of said first axially extending surface and having a larger diameter than said first axially extending surface and an annular radially extending surface interconnecting said first and second axially extending surfaces; an elongated annular seat seal mounted for axial movement in said one end passage, said seat seal having a generally radially extending sealing surface at the inner end thereof, a first outer axially extending surface, a second outer axially extending surface arranged to contact the first annular axially extending surface of said valve seat and an outer radially extending surface interconnecting said first and second outer seat seal surfaces, said seat seal having an integral construction affording a continuous internal fluid contacting surface extending from the outer end thereof to and including said sealing surface at the inner end thereof; a removable annular closure member having an annular space located in and closing said opening; an elongated valve member positioned in said central space and having a ball portion, a first trunnion extending through said opening in the side of said housing and through the annular space in said closure member and a second trunnion extending into said annular recess; bearing means in said annular space and said recess contacting said trunnions and, through said contacting, for supporting said valve member for rotational motion but preventing axial motion thereof with respect to said housing, said bearing means including an annular thrust bearing surrounding said first trunnion and arranged to contact said ball and said closure member to prevent motion of said ball toward said opening, said thrust bearing and said ball having cooperating flat surfaces in surface contact with each other in transmitting thrust from said ball to said thrust bearing, said ball portion having a fluid passage adapted to be aligned with said end passages to provide communication between said end passages in one rotational position of said ball and to be out of alignment with said end passages to prevent communication between said end passages in another rotational position of said ball, said ball portion having an outer convexly curved surface arranged to engage in sealing contact with said radially extending sealing surface of said seat seal, said sealing contact between said convexly curved surface and said radially extending sealing surface of said seat seal affording the entire sealing contact between said ball and said seat seal, spring means arranged to act between said valve seat and said seat seal to urge said seat seal axially inwardly into said sealing contact with said ball portion; and means connected to said first trunnion for rotating said valve member between said positions thereof.

References Cited in the file of this patent
UNITED STATES PATENTS

| | | |
|---|---|---|
| 2,191,232 | Heinen | Feb. 20, 1940 |
| 2,373,628 | Gleeson | Apr. 10, 1945 |
| 2,866,213 | McArthur | Dec. 30, 1958 |
| 2,883,146 | Knox | Apr. 21, 1959 |
| 2,963,260 | Siravo | Dec. 6, 1960 |
| 2,983,479 | Thomas | May 9, 1961 |
| 3,036,590 | Knox | May 29, 1962 |
| 3,045,693 | Allen | July 24, 1962 |
| 3,083,945 | Shafer | Apr. 2, 1963 |

FOREIGN PATENTS

| | | |
|---|---|---|
| 460,042 | Great Britain | Jan. 20, 1937 |